United States Patent [19]

Slocum

[11] Patent Number: 5,122,907
[45] Date of Patent: Jun. 16, 1992

[54] LIGHT POLARIZER AND METHOD OF MANUFACTURE

[75] Inventor: Robert E. Slocum, Richardson, Tex.

[73] Assignee: Polatomic, Inc., Richardson, Tex.

[21] Appl. No.: 725,521

[22] Filed: Jul. 3, 1991

[51] Int. Cl.⁵ .............................................. G02B 5/30
[52] U.S. Cl. .................... 359/797; 359/486; 359/492
[58] Field of Search ............ 359/797, 486, 490, 491, 359/492; 343/756

[56] References Cited

U.S. PATENT DOCUMENTS

| | | | |
|---|---|---|---|
| 1,873,951 | 8/1932 | Zocher | 359/492 |
| 1,956,867 | 5/1934 | Land | 359/492 |
| 2,735,092 | 2/1956 | Brown, Jr. | 343/756 |
| 2,992,425 | 7/1961 | Pratt | 359/492 |
| 3,046,839 | 7/1962 | Bird et al. | 88/65 |
| 3,353,895 | 11/1967 | Emerson | 350/155 |
| 3,540,793 | 11/1970 | Arujo et al. | 350/147 |
| 3,653,863 | 4/1972 | Arujo et al. | 65/30 |
| 3,969,545 | 7/1976 | Slocum | 427/163 |
| 4,049,338 | 9/1977 | Slocum | 350/152 |
| 4,125,404 | 11/1978 | Arujo et al. | 106/54 |
| 4,125,405 | 11/1978 | Arujo et al. | 106/54 |
| 4,282,022 | 8/1981 | Lo et al. | 65/85 |
| 4,304,584 | 12/1981 | Borelli et al. | 65/30 |
| 4,479,819 | 10/1984 | Borelli et al. | 65/30 |
| 4,486,213 | 12/1984 | Lentz et al. | 65/30 |
| 4,908,054 | 3/1990 | Jones et al. | 65/30 |

Primary Examiner—Janice A. Howell
Assistant Examiner—Kiet T. Nguyen
Attorney, Agent, or Firm—Ross, Howison, Clapp & Korn

[57] ABSTRACT

A light polarizing material has contrast greater than 10,000 for wavelengths in the visible and near-infrared spectral band (400 nm to 3,000 nm) includes prolate spheroid metal particles uniformly distributed and aligned on the surface of an optical material. The particles are evaporatively coated on a smooth glass surface. The wavelength of peak absorption is chosen by selecting the aspect ratio of the metal particles and the refractive index of the material surrounding the metal particles. The wavelength of peak absorption can be selected to fall at a desired wavelength in the range from 400 nm to 3,000 nm by control of the deposition process.

28 Claims, 3 Drawing Sheets

DIRECTION OF INCIDENT LIGHT

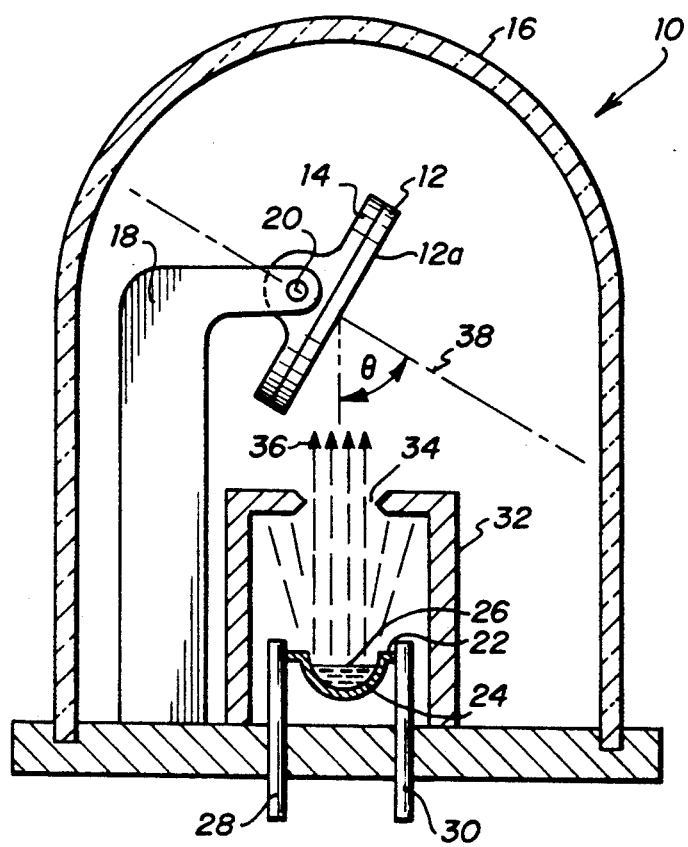
FIG. 1
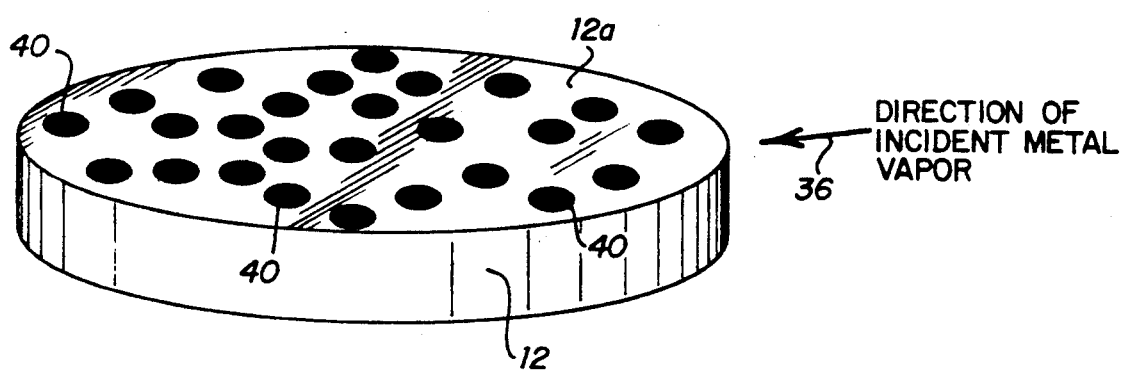
FIG. 2
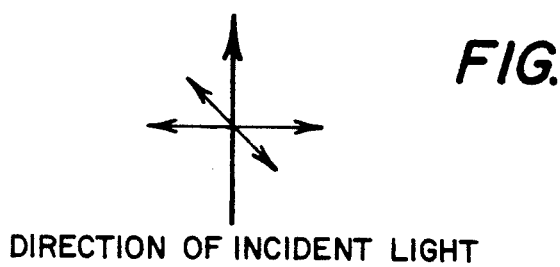
DIRECTION OF INCIDENT LIGHT

LIGHT POLARIZER AND METHOD OF MANUFACTURE

This invention was made with government support under contract number NAS7-1037 awarded by National Aeronautics and Space Administration. The government has certain rights in this invention.

TECHNICAL FIELD OF THE INVENTION

This invention relates to light polarizers, and more particularly to light polarizers and a method of manufacture using prolate spheroid metal particles deposited on a transparent sheet substrate.

BACKGROUND OF THE INVENTION

Sheet polarizers were developed to replace beamsplitter polarizers which are expensive, bulky and of limited size. The art of sheet polarizing material is well known dating from Edwin H. Land's invention of the H-sheet dichroic polarizer in 1938. Production of plastic polarizing materials in sheet form is a two step process. First, a suspension medium containing long chain molecules is stretched to align those long chain molecules. Second, polarizing dichroic molecules are added to the medium or included in the medium which attach themselves so as to be oriented along the aligned chain molecules. The light polarizing particles may also be dispersed in the medium and aligned by extruding, rolling or stretching the medium.

Although most sheet polarizing material marketed commercially has been the organic plastic material type, research has been performed on high performance glass polarizers for ophthalmic applications where high surface hardness and good scratch resistance characteristics are desired. Polarizing glasses have been prepared where ellipsoidal metallic particles are dissolved in the glass. The polarizing action is based on the fact that the ellipsoidal metal particles absorb light polarized along the long axis and transmit light polarized perpendicular to the long axis.

Three methods for making polarizing glass have been disclosed in recent patent literature. U.S. Pat. Nos. 3,540,793; 4,125,404; and 4,125,405 disclose a polarizing action in photochrome glasses containing silver halides which are darkened with actinic radiation in the range 350 nm to 410 nm and bleached with linearly polarized bleaching light.

U.S. Pat. Nos. 3,653,863 and 4,282,022 disclose the manufacture of highly polarizing glasses starting with glass which is phase separable or photochromic and contains a silver halide which is heat treated to form silver halide particles of the desired size. The glass is then subjected to a two step process. First, the glass is heated at an elevated temperature between the annealing point and the melting point (500° C. to 600° C.) followed by stretching, extruding or rolling the glass containing the silver halide particles to elongate them and orient the particles to an ellipsoidal shape. Second, the glass is subjected to irradiation by actinic radiation to produce silver metal on the surface of the silver halide particles. An improvement of the second step is disclosed in U.S. Pat. No. 4,304,584 where the extruded glass is heat treated in a reducing environment at temperatures below the annealing point of the glass in order to produce elongated metallic silver in the glass or on the silver halide particles in a surface layer of the glass at least ten microns thick. The process includes the making composite glass bodies where polarizing and photochromic glass layers are combined and laminated.

A further method for making polarizing glass is disclosed in U.S. Pat. No. 4,479,819 for the near infrared spectral region described as 700 nm to 3000 nm by improved glass drawing and high temperature reduction techniques. A further method is disclosed in U.S. Pat. No. 4,486,213 for the cladding of a core polarizing glass with a skin glass in order to achieve high aspect ratios for the elongated metal particles. U.S. Pat. No. 4,908,054 discloses methods for improving the contrast and the bandwidth of polarization action for the product described in U.S. Pat. No. 4,479,819.

A third class of polarizers are Hertzian polarizers which place metal wires on the surface of a transparent optical material. Prior to 1900, Heinrich Hertz demonstrated a method for polarizing radiation using an array of parallel reflective wires which were long compared to the wavelength of the radiation to be polarized, and the wires were separated by a distance much less than the wavelength to be polarized. The Hertzian polarizer is often configured as a grid of wires but can also be irregularly spaced wires which meet the polarization conditions. The Hertzian polarizer transmits the radiation with electrical vector perpendicular to the wires and reflects radiation with electrical vector parallel to the wires.

U.S. Pat. No. 3,046,839 discloses a method of manufacturing a Hertzian polarizer on the surface of an optical material by forming a diffraction grating on the surface. The diffraction grating consists of grooves and the groove tips are evaporatively coated with metal to form an array of metal filaments. U.S. Pat. No. 3,353,895 discloses a method of manufacturing a Hertzian polarizing material by forming metal filaments using an evaporative shadowing method. Evaporated metal is directed near the grazing angle toward a bumpy transparent material covered with protuberances. Metal filaments of a Hertzian polarizer are produced by forming filaments which lie along side the protuberances and are separated by the shadows cast by the protuberances.

U.S. Pat. Nos. 3,969,545 and 4,049,338 disclose a Hertzian polarizer having filaments of metal which are evaporatively deposited on smooth surfaces of transparent optical material. The metal elements of the Hertzian polarizer are silver whiskers grown on the surface by grazing angle vacuum deposition of silver.

Each of the three classes of sheet polarizers lack characteristics to produce a high performance polarizing material suitable for both the visible and near-infrared spectral region (400 nm to 3,000 nm). The plastic sheet polarizers have poor performance in the near-infrared spectral region and are easily damaged because of the softness of plastic. The Hertzian polarizers applied to optically transparent materials reflect rather than absorbs the unwanted polarization components of radiation which is particularly undesirable for ophthalmic and display applications. The Hertzian method, although successfully applied to the near-infrared spectral region, has not been effectively extended to the visible portion of the spectrum because of the difficulty of producing a uniform density of metal filaments spaced at separations much less than the wavelength of light. Finally the polarizing glass method is limited to glasses which are highly specialized compositions containing silver. Although the polarizing glasses under the trademark POLACOR are effective near-infrared polarizers, the original goal of manufacturing ophthalmic quality glass for use in quality and prescription sunglasses has not be achieved. This unmet goal is due to the complexity and difficulty of the shaping and heating of specialty glasses and a failure to control the shape and uniformity of the polarizing metal particles for the visible spectral region.

A need has thus arisen for a polarizer and method of manufacturing polarizing material having high performance for both the visible and near-infrared spectral regions.

SUMMARY OF THE INVENTION

The present invention sets forth a method of making polarizing material having high contrast in the visible and near-infrared spectral bands (400 nm to 3,000 nm). The method consists of covering the surface of an optical material with aligned prolate spheroid metal particles. The light polarization component parallel the alignment direction is absorbed and the polarization component perpendicular to the alignment direction is transmitted. The wavelength of peak polarization is determined by the length-to-width ratio of the prolate spheroid metal particles and the refractive index of transparent material surrounding the metal particles. A light polarizing material is disclosed which has contrast greater than 10,000 for wavelengths in the visible and near-infrared spectral band. The material is comprised of prolate spheroid silver particles uniformly distributed and aligned on the surface of an optical material. A method is set forth for making polarizing material by evaporatively coating a smooth glass surface with multiple layers of prolate spheroid metal particles. The wavelength of peak absorption can be selected to fall at a desired wavelength in the range from 400 nm to 3,000 nm by control of the deposition process. A method is disclosed for the evaporative deposition of metal particles directly on to a smooth optical surface and locating the wavelength of peak absorption by variation of the multilayer deposition process.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 1 is a schematic side view, with elements partially in cross section, illustrating deposition of vaporized metal upon a substrate;

FIG. 2 is a magnified illustration of the resulting prolate spheroid metal particles deposited on a substrate in accordance with the present invention;

DESCRIPTION OF THE PREFERRED EMBODIMENTS

Figure 3:
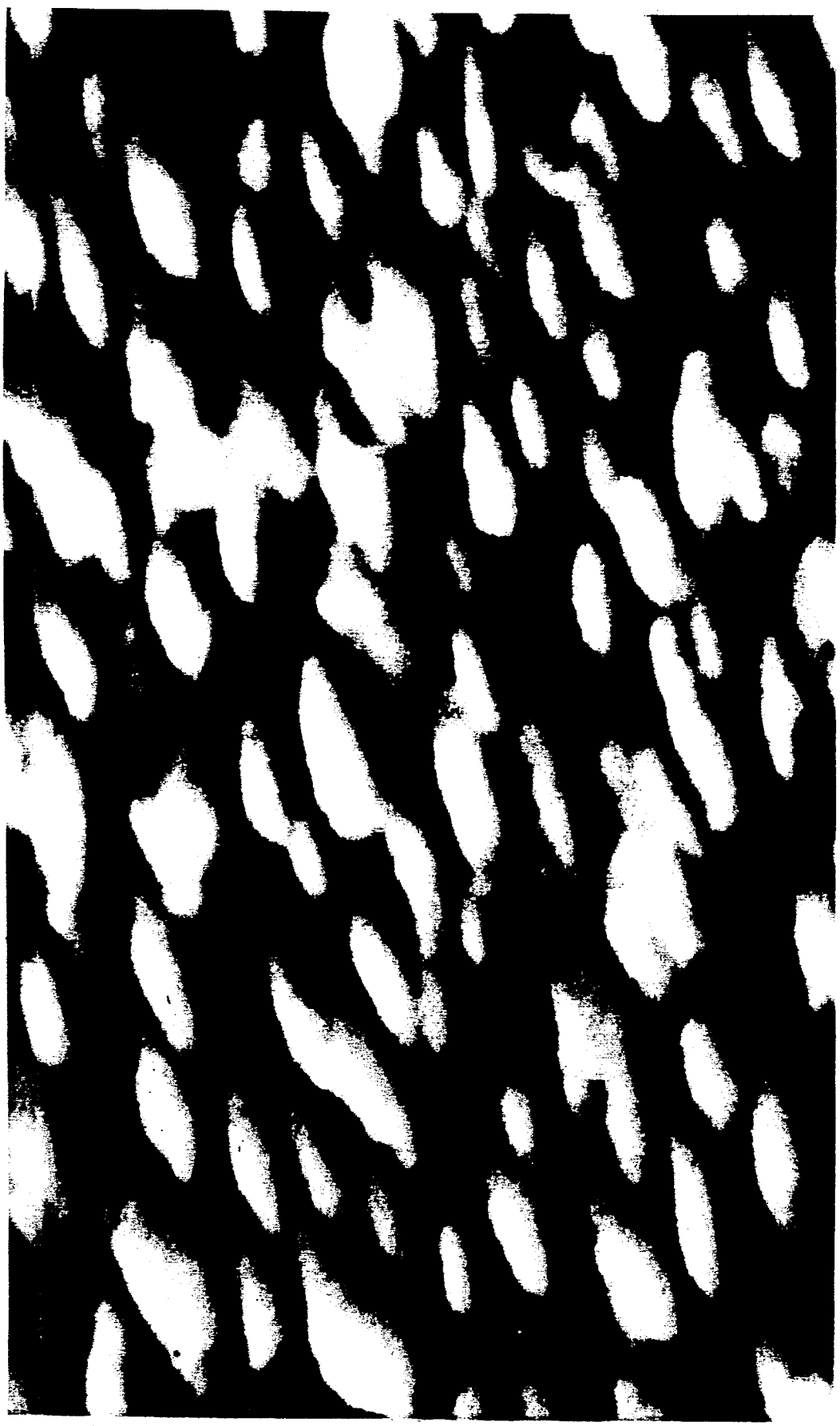
FIG. 3 is an electron microscope picture of a surface coated in accordance with the present invention.

The anisotropic polarization dependence of the optical absorbance of spheroidal metal particles is well known from such texts as van de Hulst and the suspension of such particles in glass (Corning) or plastics (Land). The properties of spheroidal metal particles on flat surfaces has been investigated by practioners of Surfaced Enhanced Ramann Scattering (SERS). Scientific investigators have observed weak polarization effects in metal thin films. The present invention places metal particles on the surface of a transparent optical material in such a way as to achieve significant anisotropic absorption of light with large transmission of the polarization component vibrating perpendicular to the alignment axis and large absorbance of the component vibrating parallel to the alignment axis so as to make the material useful as a polarizer. The present invention includes a process for selecting the particle volume and aspect ratio to effectively tune the wavelength of peak polarization of the material to the desired wavelength in the range covering 450 nm to 3000 nm.

A transparent optical element selected for the substrate of the polarizing material may comprise, for example, a 25 mm diameter disc of BK-7 glass which has been polished to an optical quality, microscopically smooth finish. A method for the application of a coating of silver particles to the surface of a substrate is evaporative vacuum deposition. An important aspect of the present invention is the deposition technique of impinging evaporated metal on the substrate at an angle near the grazing angle greater than 85 degrees to the normal of the substrate surface to form prolate spheroids on the surface of the substrate.

Referring now to FIG. 1, a method of forming a light polarizing material according to the present invention is illustrated. The method utilizes a vacuum deposition system, generally identified by the numeral 10. A substrate 12 having a microscopically smooth surface 12a is mounted on a substrate holder 14 in a bell jar 16. Substrate 12 is mounted to substrate holder 14 by utilizing, for example, screws or adhesive. Substrate holder 14 is attached to a support 18 through a pin 20 which allows substrate holder 14 and substrate 12 to pivot or rotate relative to support 18. The deposition system 10 includes a heater element 22 having a receptacle 24 for retaining material, such as in the preferred embodiment of the present invention, metal source 26 to be vaporized. Heater element 22 is connected to heater electrodes 28 and 30 which are in turn connected to a source of power (not shown). Between metal source 26 and substrate 12 is a collimating apparatus 32 having a collimating slit or aperture 34.

The substrate 12 is mounted to substrate holder 14 and positioned at the desired angle to a metal deposition beam 36 at a distance of approximately 20 cm from the metal source 26 inside bell jar 16. The substrate holder 14 is designed so that the substrate 12 can be rotated 180 degrees about the normal to substrate 12 at the center of substrate 12. Substrate Position 1 as used herein will refer to the alignment of substrate 12 at 0 degrees between the direction of impinging metal deposition beam 36 and an axis 38 to substrate 12 as shown in FIG. 1. Substrate Position 2 as used herein will refer to alignment of substrate 12 when rotated 180 degrees from Position 1 about an axis in the center of the substrate 12 normal to the surface.

In operation, the process according to the preferred embodiment of the present invention includes first cleaning surface 12a of substrate 12 before mounting substrate 12 in bell jar 16. The metal source 26 to be vapor deposited is placed in receptacle 24 which in turn is connected to a source of current. Before activating the current source the bell jar 16 is evacuated to a pressure less than 0.00001 torr using known techniques. When the deposition process is activated, metal atoms adhere to the surface of the substrate 12 and form a prolate spheroid shape particle with the long axis of the spheroid aligned with the direction of the evaporated metal deposition beam 36. A metal of choice for a preferred embodiment of the present invention is pure silver. Samples in accordance with the present invention described herein were prepared by evaporating 0.125 cc of silver, but only a small faction of the silver actually is deposited on the surface 12a of substrate 12.

FIG. 2 illustrates the resulting vaporized metal pattern on surface 12a of substrate 12 to form a plurality of prolate spheroid shaped particles 40 with their longitudinal axis aligned with the direction of the evaporated metal deposition beam 36. FIG. 3 illustrates a transmission electron microscope picture of the coating formed.

A variety of deposition techniques have been developed for preparing island film of disconnected metal particle with shapes which are spherical, ellipsoidal and in the shape of whiskers. The present method provides for preparation of silver metal particles which exhibit the distinctive polarization behavior of prolate metal spheroids. In addition, the process provides for selecting the wavelength of peak polarization by causing the evaporated metal 26 to impinge on substrate surface 12a in a specific sequence of impingement directions with a specific fraction of silver arriving at the surface 12a in each sequence. This procedure physically selects the effective length-to-width ratio of the metal particles 40 which determines the wavelength of peak polarization. In addition, the wavelength of peak absorption can be shifted to longer wavelength by increasing the refractive index of the medium which surrounds the metal particles 40. The metal particles 40 which are deposited directly on the surface of the substrate 12 are effectively surrounded by air with a refractive index of 1.0. The refractive index can be increased by evaporatively or chemically coating substrate 12 with material having a high index of refraction. This method of wavelength selection is demonstrated herein by the application of an optical adhesive with refractive index of 1.50. Various methods of producing polarizing materials in accordance with the present invention will now be described.

Figure 4:
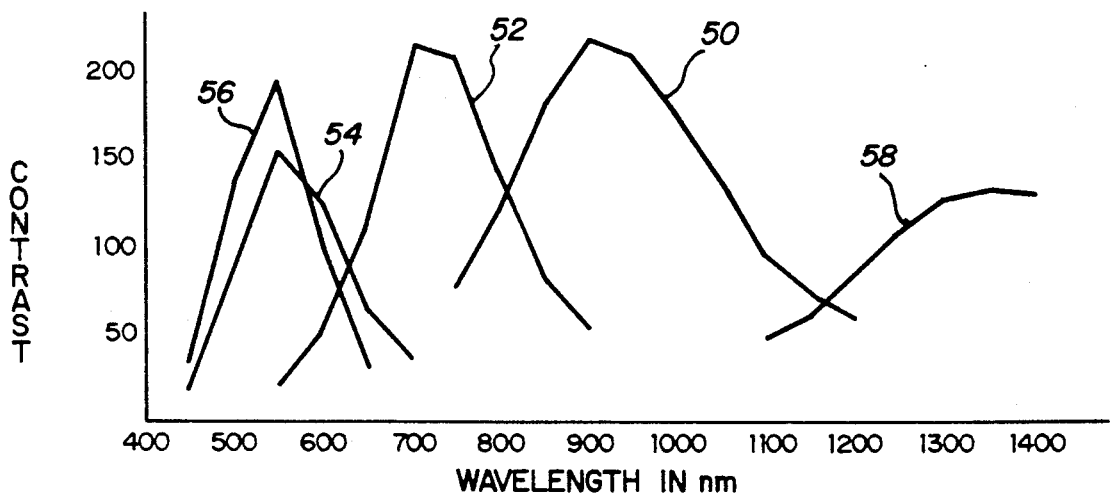
FIGS. 4 and 5 are graphs illustrating contrast curves for various deposition methods in accordance with the present invention.

A first deposition method divides the process into two parts so that half of the silver deposition material is deposited in Position 1 and half of the silver is deposited in Position 2. Peak polarization occurs at 900 nm with particle transmittances $k_1 = 0.68$ and $k_2 = 0.0029$. The film has contrast of about 235 at 900 nm. Contrast is defined as $k_1/k_2$ where $k_1$ is the maximum transmittance (light linearly polarized perpendicular the long axis) and $k_2$ is the minimum transmittance (light polarized parallel the long axis). The contrast curve is illustrated as curve 50 in FIG. 4.

A second deposition method divides the process into four parts so that half the silver is deposited in Position 1 and half of the silver is deposited in Position 2. Four depositions were made in the position order 1,2, 1,2. Peak polarization occurs at 700 nm with principle transmittances $k_1 = 0.60$ and $k_2 = 0.0028$. The contrast at 700 nm is about 214. The contrast curve is illustrated as curve 52 in FIG. 4.

A third deposition method divides the process into 6 parts so that one half of the silver is deposited in Position 1 and one half of the silver is deposited in Position 2. Six depositions were made in the position order 1,2, 1,2, 1,2. Peak polarization occurs at 550 nm with principle transmittances $k_1 = 0.58$ and $k_2 = 0.0038$. The contrast is about 153. The contrast curve is illustrated as curve 54 in FIG. 4.

A fourth deposition method divides the process into eight parts so that half of the silver is deposited in Position 1 and half of the silver is deposited in Position 2. Eight depositions were made in the position order 1,2. 1,2, 1,2, 1,2. Peak polarization occurs at 550 nm with principle transmittances $k_1 = 0.42$ and $k_2 = 0.0022$ and contrast of about 191. The contrast curve is illustrated as curve 56 in FIG. 4.

A fifth deposition method includes the process of the first deposition method described above and then coating the surface of the metal film with optical adhesive (Norlin) which has an index of refraction of 1.50. The wavelength of peak absorption shifts from 900 nm to 1350 nm. This method illustrates the analytical prediction stating that the wavelength of peak polarization will be approximately equal to the wavelength of peak polarization in air times in index of refraction of the material surrounding the particles. The contrast curve is illustrated as curve 58 in FIG. 4.

Figure 5:
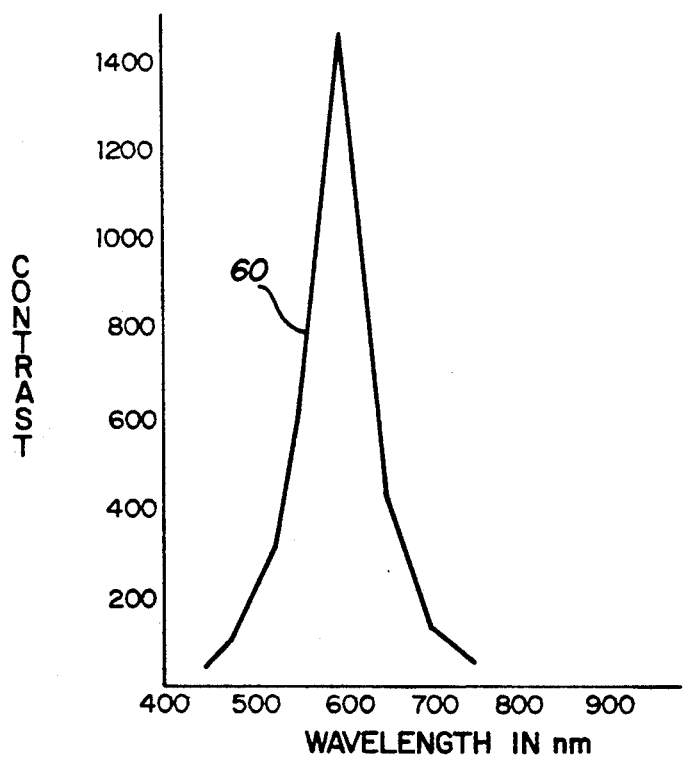

A sixth deposition method includes the process of the third deposition method described above with the following modification in the preparation of the substrate 12 in order to improve the polarizing characteristics of the material at 600 nm. Substrate 12 is first coated with silver and heat treated prior to application of the third method. The substrate 12 is coated by the first method described above using 0.025 cc of silver for the total evaporation. The substrate 12 is heated in a vacuum system for 4 minutes at a distance of 10 cm from receptacle 24 at the temperature normally required to evaporate silver. The precoat of heated silver joins the silver deposited according to the third method to produce improved contrast of 1466 at 600 nm as shown by curve 60 on FIG. 5.

The layer of silver particles deposited on substrate 12 can be formed by transfer from another substrate by lift-off techniques. The original deposition surface is precoated with a light coat of Teflon which is invisible to the eye. The silver particles are deposited on top of the Teflon precoat. Substrate 12 is coated with optical adhesive which is pressed against the surface of the substrate coated with silver particles. The adhesive is cured and the substrates are separated leaving the silver particle film transferred to the surface of substrate 12 by attachment to the optical adhesive.

Although vapor deposition techniques have been disclosed herein for depositing the prolate spheroid metal particles 40 on the surface of substrate 12, additionally, lithographic methods may be utilized for depositing the metal particles 40 such as described in "Optical Absorbance of Silver Ellipsoidal Particles"; M. C. Buncick, R. J. Warmack and T. L. Ferrell; *J. Opt. Society of American B*; Vol. 4, June 1987, page 927–933; and "Fabrication of a High Density Storage Medium for Electron Beam Memory"; J. A. Oro and J. C. Wolf; *J. Vac. Science Technology B*1(4): Oct.–Dec. 1983, page 1088-1090.

It therefore can be seen that the present invention provides for a polarizer and method for manufacturing polarizing material having high performance for both the visible and near-infrared spectral region. The present invention provides for covering the surface of an optical material with aligned prolate spheroid metal particles in which the light polarization component parallel to the alignment direction of the metal particles is absorbed and the polarization component perpendicular to the alignment of the metal particles is transmitted.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A light polarizer, comprising:
   a transparent substrate; and
   a plurality of prolate spheroid metal particles disposed on the surface of said transparent substrate, each of said metal particles having a longitudinal axis and a length less than the wavelength of the light to be polarized, said plurality of metal particles being disposed on said transparent substrate, such that said longitudinal axes are aligned parallel to one another to thereby absorb unwanted light in a direction parallel to said longitudinal axes of said metal particles and to transmit desired light in a direction perpendicular to the longitudinal axes of said metal particles.

2. The light polarizer of claim 1 where said plurality of metal particles transmit light with the electric vector vibrating perpendicular to the longitudinal axes of said metal particles and absorb light with the electric vector vibrating parallel to the longitudinal axes of said metal particles, said absorption reaching a peak at a wavelength determined by the aspect ratio of the metal particles and the index of refraction of material surrounding said metal particles.

3. The light polarizer of claim 1 wherein said transparent substrate is selected from the group of glasses and plastics transparent to visible light.

4. The light polarizer of claim 1 wherein said transparent substrate is selected from the group of glasses and plastics transparent to infrared radiation.

5. The light polarizer of claim 1 wherein the length-to-width ratio of said metal particles are selected from values in the range from about 1 to about 20 to thereby set the wavelength of peak polarization in the wavelength band between about 300 nm and the near-infrared spectral region.

6. The light polarizer of claim 1 wherein the index of refraction of material surrounding the particles is selected to select the wavelength of peak polarization.

7. The light polarizer of claim 1 and further including:
   a plurality of layers of transparent substrates wherein one or more surfaces of said plurality of said transparent substrates are covered with one or more layers of metal particles.

8. The light polarizer of claim 1 wherein said metal particles have an effective volume of spheres approximately 5 nm to 100 nm in diameter.

9. The light polarizer of claim 1 wherein the density and volume of said metal particles are chosen to select transmittances $k_1$ to $k_2$ of the polarizing material to achieve a contrast greater than 1000 at the wavelength of peak polarization.

10. The light polarizer of claim 1 wherein said metal particles are deposited on the surface of said transparent substrate utilizing vacuum deposition.

11. The light polarizer of claim 1 wherein said metal particles are formed by lithography.

12. The light polarizer of claim 1 wherein said metal particles comprise silver.

13. The light polarizer of claim 1 wherein said metal particles are transferred to the surface of said transparent substrate.

14. The light polarizer of claim 7 wherein said metal particles are deposited on the surface of said transparent substrate in two or more layers separated by transparent layers.

15. A process of making light polarizing material, comprising:
   forming a plurality of prolate spheroid metal particles disposed on the surface of a transparent substrate, each of the metal particles having a longitudinal axis and a length less than the wavelength of the light to be polarized, the plurality of metal particles being disposed on the transparent substrate, such that the longitudinal axes are aligned parallel to one another to thereby absorb unwanted light in a direction parallel to the longitudinal axes of the metal particles and to transmit desired light in a direction perpendicular to the longitudinal axes of the metal particles.

16. The process of claim 15 where the plurality of metal particles transmit light with the electric vector vibrating perpendicular to the longitudinal axes of the metal particles and absorb light with the electric vector vibrating parallel to the longitudinal axes of the metal particles, and selecting maximum absorption at a wavelength determined by the aspect ratio of the metal particles and the index of refraction of material surrounding said metal particles.

17. The process of claim 15 including the selecting the transparent substrate from the group of glasses and plastics transparent to visible light.

18. The process of claim 15 including the selecting the transparent substrate from the group of glasses and plastics transparent to infrared radiation.

19. The process of claim 15 including the selecting the length-to-width ratio of the metal particles from values in the range from about 1 to about 20 to thereby set the wavelength of peak polarization in the wavelength band between about 300 nm and the near-infrared spectral region.

20. The process of claim 15 including the selecting the index of refraction of material surrounding the particles to select the wavelength of peak polarization.

21. The process of claim 15 and further including the:
   creating a plurality of layers of transparent substrates wherein one or more surfaces of the plurality of the transparent substrates are covered with one or more layers of metal particles.

22. The process of claim 15 wherein the metal particles are formed to have an effective volume of a sphere with diameter approximately 5 nm to 100 nm.

23. The process of claim 15 wherein the density and volume of the metal particles are formed to select transmittances $k_1$ to $k_2$ of the polarizing material to achieve a contrast greater than 1000 at the wavelength of peak polarization.

24. The process of claim 15 wherein the metal particles are formed on the surface of said transparent substrate by vacuum deposition.

25. The process of claim 15 wherein the metal particles are formed by lithography.

26. The process of claim 15 wherein the metal particles comprise silver.

27. The process of claim 15 wherein the metal particles are transferred to the surface of the transparent substrate.

28. The process of claim 21 wherein the metal particles are deposited on the surface of said transparent substrate in two or more layers separated by transparent substrate layers.

* * * * *